United States Patent
Lai et al.

(10) Patent No.: US 10,191,583 B2
(45) Date of Patent: Jan. 29, 2019

(54) TOUCH-CONTROL DISPLAY PANEL, DRIVING METHOD THEREOF, AND TOUCH-CONTROL DISPLAY DEVICE

(71) Applicants: Xiamen Tianma Micro-electronics Co., Ltd., Xiamen (CN); Tianma Micro-electronics Co., Ltd., Shenzhen (CN)

(72) Inventors: Qingjun Lai, Xiamen (CN); Zhaokeng Cao, Shanghai (CN); Poping Shen, Xiamen (CN); Xiufeng Zhou, Xiamen (CN); Yihua Zhu, Xiamen (CN); Zhaodong Zhang, Xiamen (CN)

(73) Assignees: XIAMEN TIANMA MICRO-ELECTRONICS CO., LTD., Xiamen (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 42 days.

(21) Appl. No.: 15/385,805

(22) Filed: Dec. 20, 2016

(65) Prior Publication Data
US 2017/0102821 A1  Apr. 13, 2017

(30) Foreign Application Priority Data
Jul. 29, 2016  (CN) ........................ 2016 1 0617363

(51) Int. Cl.
*G06F 3/041* (2006.01)
*G06F 3/044* (2006.01)
(52) U.S. Cl.
CPC ............ *G06F 3/0416* (2013.01); *G06F 3/044* (2013.01); *G06F 2203/04111* (2013.01)
(58) Field of Classification Search
CPC ................... G06F 3/0416; G06F 3/044; G06F 2203/04111
See application file for complete search history.

(56) References Cited

U.S. PATENT DOCUMENTS 5,392,058 A * 2/1995 Tagawa ................ B25J 19/0012
345/103
8,451,250 B2 * 5/2013 Hsieh ...................... G06F 3/044
345/173
(Continued)

FOREIGN PATENT DOCUMENTS

| CN | 101676846 A | 3/2010 |
| CN | 102375273 A | 3/2012 |
| CN | 104331196 A | 2/2015 |

*Primary Examiner* — Mihir K Rayan
(74) *Attorney, Agent, or Firm* — Anova Law Group, PLLC

(57) ABSTRACT

A touch-control display panel, a driving method thereof, and a touch-control display device are provided. The display panel includes a first substrate and a plurality of touch-control driving electrodes extending along a second direction. The first substrate includes a first touch-control display region and a second touch-control display region arranged along a first direction. The plurality of touch-control driving electrodes include first touch-control driving electrodes distributed in the first touch-control display region and second touch-control driving electrodes distributed in the second touch-control display region. The number of the first touch-control driving electrodes is equal to the number of the second touch-control driving electrodes. One first touch-control driving electrode and one second touch-control driving electrode are scanned simultaneously, a distance from the one first touch-control driving electrode to the second touch-control display region is equal to a distance from the one second touch-control driving electrode to the first touch-control display region.

13 Claims, 8 Drawing Sheets

(56) References Cited

U.S. PATENT DOCUMENTS

| | | | |
|---|---|---|---|
| 8,890,854 B2* | 11/2014 | Tenuta | G06F 3/044 |
| | | | 178/18.06 |
| 9,619,088 B2* | 4/2017 | Azumi | G06F 3/044 |
| 2003/0122771 A1* | 7/2003 | Sumiyoshi | G02F 1/133621 |
| | | | 345/102 |
| 2009/0267903 A1* | 10/2009 | Cady | G06F 3/0416 |
| | | | 345/173 |
| 2010/0066692 A1* | 3/2010 | Noguchi | G06F 3/0412 |
| | | | 345/173 |
| 2012/0050193 A1* | 3/2012 | Noguchi | G02F 1/13338 |
| | | | 345/173 |
| 2013/0265282 A1* | 10/2013 | Nakagawa | G06F 3/0416 |
| | | | 345/174 |
| 2015/0022494 A1* | 1/2015 | Azumi | G06F 3/044 |
| | | | 345/174 |
| 2017/0068386 A1* | 3/2017 | Lai | G06F 3/0416 |

* cited by examiner

TOUCH-CONTROL DISPLAY PANEL, DRIVING METHOD THEREOF, AND TOUCH-CONTROL DISPLAY DEVICE

CROSS-REFERENCES TO RELATED APPLICATIONS

This application claims priority of Chinese Patent Application No. 201610617363.9, filed on Jul. 29, 2016, the entire contents of which are hereby incorporated by reference.

FIELD OF THE INVENTION

The present disclosure generally relates to the field of display technology and, more particularly, relates to a touch-control display panel, a driving method thereof, and a touch-control display device containing the touch-control display panel.

BACKGROUND

With the development of human-computer interaction techniques, the touch-control technique has been increasingly applied in all kinds of display devices. Specifically, the capacitive touch-control technique has been widely used due to advantages such as good wear resistance, long service life, low maintenance cost during use, and support of gesture recognition and multi-touch.

Specifically, a current touch-control display panel utilizing the capacitive touch-control technique often includes an array substrate, a color film substrate, touch-control driving electrodes, touch-control detecting electrodes, touch-control lead wires, and a driving circuit. FIG. 1 illustrates a top view of a first substrate in an existing touch-control display panel.

As shown in FIG. 1, the touch-control driving electrodes 2' are disposed on the array substrate 1' and extend along a second direction (a Y direction). The touch-control detecting electrodes 5' are disposed on a color film substrate and extend along a first direction (a X direction). Projections of the touch-control detecting electrodes 5' on the array substrate 1' overlap the touch-control driving electrodes 2'.

The touch-control lead wires 8' are disposed on the array substrate 1', and are electrically connected to the touch-control driving electrodes 2'. The driving circuit 9' transmits driving signals to the touch-control driving electrodes 2' via the touch-control lead wires 8'.

When the touch-control display panel is touched, a capacitance between the touch-control driving electrodes 2' and the touch-control detecting electrodes 5' varies due to the occurrence of touch control, and the touch-control detecting electrodes 5' transmit information regarding the capacitance (or current) to a printed circuit in the touch-control display panel. The printed circuit (or the driving circuit 9') may analyze and calculate a location where the touch control occurs based on the information regarding the capacitance (or voltage/current) transmitted by the touch-control detecting electrodes 5'.

However, for the existing touch-control display panels that utilize the capacitive touch-control technique, in a touch-control sensing period, to avoid a plurality of touch-control detecting electrodes 5' being interfered, the touch-control driving electrodes 2' are sequentially scanned along a scanning direction S' shown in FIG. 1 (consistent with the X direction). A scanning process using such a scanning method takes, however, relatively long time.

The disclosed touch-control display panel, driving method of the touch-control display panel, and touch-control display device are directed to solve one or more problems set forth above and other problems.

BRIEF SUMMARY OF THE DISCLOSURE

One aspect of the present disclosure provides a display panel. The display panel includes a first substrate, and a plurality of touch-control driving electrodes disposed on the first substrate. The first substrate further includes a first touch-control display region and a second touch-control display region arranged along a first direction. The plurality of touch-control driving electrodes extend along a second direction. Further, the plurality of touch-control driving electrodes include first touch-control driving electrodes distributed in the first touch-control display region and second touch-control driving electrodes distributed in the second touch-control display region. The number of the first touch-control driving electrodes distributed in the first touch-control display region is equal to the number of the second touch-control driving electrodes distributed in the second touch-control display regions. One first touch-control driving electrode and one second touch-control driving electrode are scanned simultaneously, and the distance from the first touch-control driving electrode to the second touch-control display region is equal to the distance from the second touch-control driving electrode to the first touch-control display region.

Another aspect of the present disclosure provides a driving method for a touch-control display panel. The display panel includes a first substrate, and a plurality of touch-control driving electrodes disposed on the first substrate. The first substrate further includes a first touch-control display region and a second touch-control display region arranged along a first direction. The plurality of touch-control driving electrodes extend along a second direction. Further, the plurality of touch-control driving electrodes include first touch-control driving electrodes distributed in the first touch-control display region and second touch-control driving electrodes distributed in the second touch-control display region. The number of the first touch-control driving electrodes distributed in the first touch-control display region is equal to the number of the second touch-control driving electrodes distributed in the second touch-control display regions. One first touch-control driving electrode and one second touch-control driving electrode are scanned simultaneously, the distance from the one first touch-control driving electrode to the second touch-control display region is equal to the distance from the one second touch-control driving electrode to the first touch-control display region. The driving method of the touch-control display panel includes scanning one first touch-control driving electrode and one second touch-control driving electrode simultaneously in the touch-control sensing period. Each display period of the touch-control display panel includes at least one touch-control sensing period. The scanning direction of the first touch-control driving electrodes in the first touch-control display region is opposite to the scanning direction of the second touch-control driving electrodes in the second touch-control display region.

Another aspect of the present disclosure provides a touch-control display device. The touch-control display device includes a touch-control display panel and a backlight module group. The touch-control display panel includes a first substrate, and a plurality of touch-control driving electrodes disposed on the first substrate. The first substrate includes a first touch-control display region and a second touch-control display region arranged along a first direction.

The plurality of touch-control driving electrodes extend along a second direction. Further, the touch-control driving electrodes include first touch-control driving electrodes distributed in the first touch-control display region and second touch-control driving electrodes distributed in the second touch-control display region. Further, the number of the first touch-control driving electrodes distributed in the first touch-control display region is equal to the number of the second touch-control driving electrodes distributed in the second touch-control display region. One first touch-control driving electrode and one second touch-control driving electrode are scanned simultaneously. The distance from the one first touch-control driving electrode to the second touch-control display region is equal to the distance from the second touch-control driving electrode to the first touch-control display region.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, in the present disclosure, the disclosed embodiments and the features of the disclosed embodiments may be combined or separated under conditions without conflicts.

Figure 1:
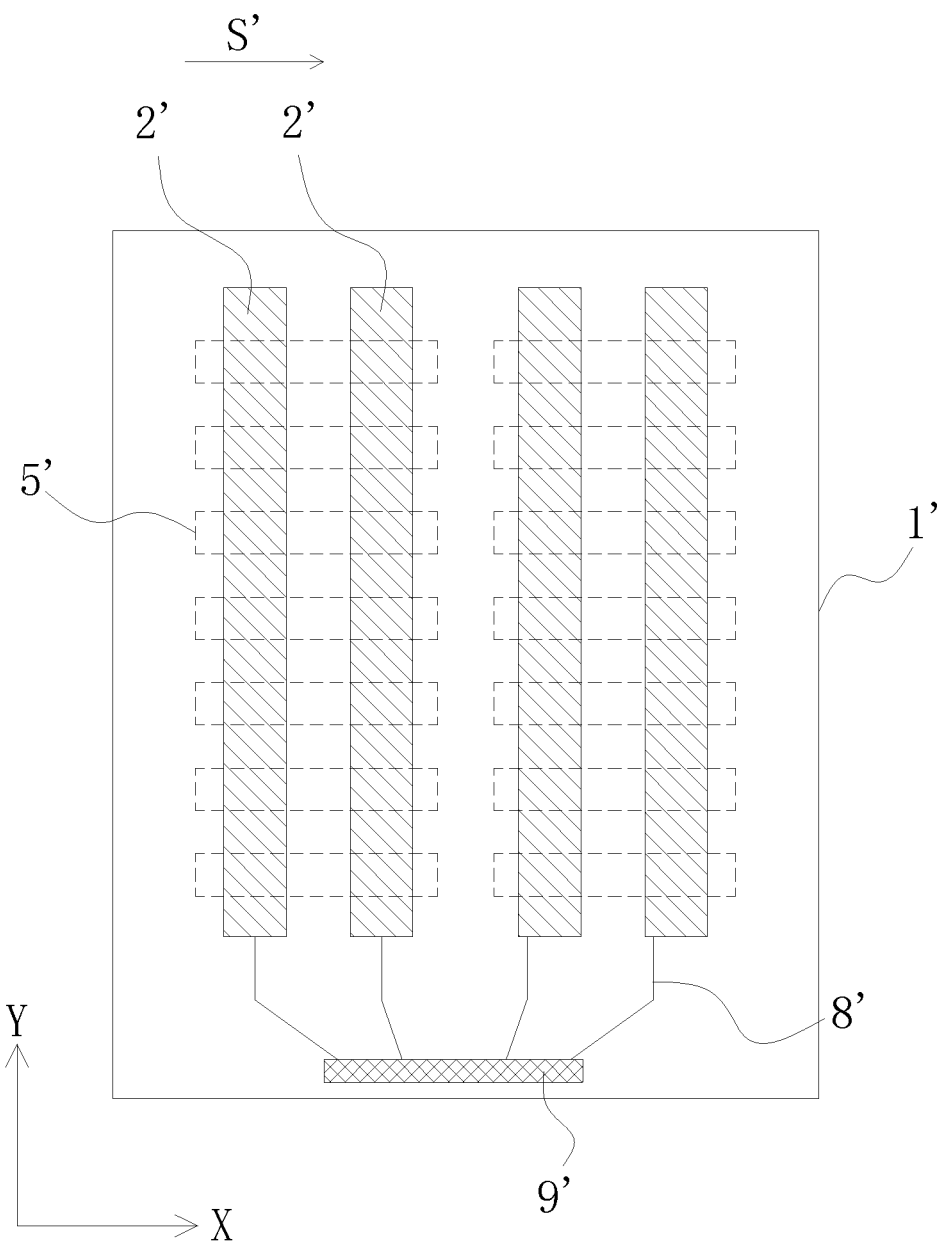
FIG. 1 illustrates a top view of an existing touch-control display panel.

As discussed above, for existing touch-control display panels that utilize the capacitive touch-control technique, during a touch-control sensing period, touch-control driving electrodes 2' are sequentially scanned along a scanning direction S' shown in FIG. 1 (consistent with a X direction) to avoid a plurality of touch-control detecting electrodes 5' being interfered. However, a scanning process using such a scanning method may take relatively long time.

The present disclosure provides a touch-control display panel, a driving method of the touch-control display panel, and a touch-control display device containing the touch-control display panel. The disclosed touch-control display panel and driving method may effectively improve a scanning rate in a touch-control sensing period and effectively reducing mutual interference between the touch-control detecting electrodes 5'. Accordingly, occurrence of abnormal signals may be avoided.

Referring to FIG. 2~FIG. 6, FIG. 2~FIG. 6 illustrate a top view of a first substrate in an exemplary touch-control display panel, a top view of a second substrate, projections of touch-control detecting electrodes on a first substrate, a perspective view of a touch-control display panel, and a cross-sectional view of a touch-control display panel, respectively.

As shown in FIG. 2~FIG. 5, in certain embodiments of the present disclosure, the touch-control display panel may be a liquid crystal display panel or an organic light-emitting diode (OLED) display panel. The touch-control display panel may include at least a first substrate 1 and a plurality of touch-control driving electrodes disposed on the first substrate 1.

Figure 2:
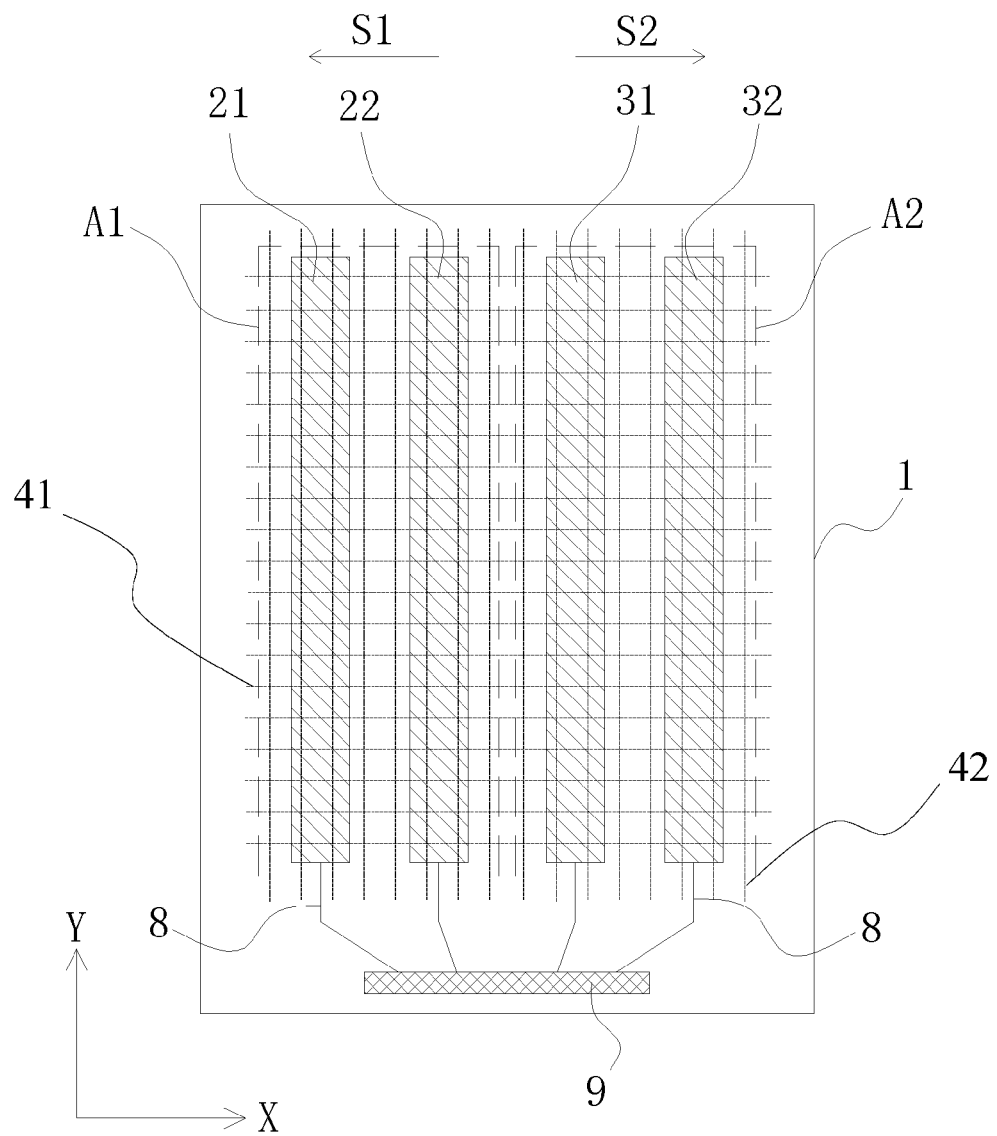
FIG. 2 illustrates a top view of an exemplary first substrate consistent with disclosed embodiments.

Specifically, as shown in FIG. 2, the first substrate 1 may optionally be an array substrate. The first substrate 1 may include a first touch-control display region A1 and a second touch-control display region A2 (two regions enclosed by dashed lines in FIG. 2) arranged along a first direction (an X direction shown in FIG. 2).

A plurality of touch-control driving electrodes may be disposed on the first substrate 1, and each touch-control driving electrode may extend along a second direction (a Y direction shown in FIG. 2). Optionally, the first direction (the X direction shown in FIG. 2) may be perpendicular to the second direction (the Y direction shown in FIG. 2). Specifically, as shown in FIG. 2, the touch-control driving electrodes may include first touch-control driving electrodes and second touch-control driving electrodes.

In particular, a plurality of touch-control driving electrodes may be distributed in the first touch-control display region A1 and the second touch-control display region A2 of the first substrate 1. Further, the touch-control driving electrodes distributed in the first touch-control display region A1 may be the first touch-control driving electrodes, and the touch-control driving electrodes distributed in the second touch-control display region A2 may be the second touch control driving electrodes. The number of the first touch-control driving electrodes distributed in the first touch-control display region A1 may equal to the number of the second touch-control driving electrodes distributed in the second touch-control display region A2.

In one embodiment, as illustrated in FIG. 2, the first touch-control display region A1 may include two first touch-control driving electrodes 21 and 22, and the second touch-control display region A2 may include two second touch-control driving electrodes 31 and 32. In other embodiments of the present disclosure, the number of the first touch-control driving electrodes distributed in the first touch-control display region A1 and the number of the second touch-control driving electrodes distributed in the second touch-control display region A2 may vary based on actual needs.

Further, one first touch-control driving electrode and one second touch-control driving electrode may be scanned simultaneously. The distance from the first touch-control driving electrode to the second touch-control display region may be equal to the distance from the second touch-control driving electrode to the first touch-control display region. Specifically, in one embodiment shown in FIG. 2, a distance from the first touch-control driving electrode 22 to the second touch-control display region A2 may be equal to a distance from the second touch-control driving electrode 31 to the first touch-control display region A1.

Thus, during a touch-control sensing period of the touch-control display panel, the first touch-control driving electrode 22 and the second touch-control driving electrode 31 may be scanned simultaneously. That is, touch-control driving signals may be outputted to the first touch-control driving electrode 22 and the second touch-control driving electrode 31 simultaneously. Similarly, the distance from the first touch-control driving electrode 21 to the second touch-control display region A2 may be equal to the distance from the second touch-control driving electrode 32 to the first touch-control display region A1.

Thus, during the touch-control sensing period of the touch-control display panel, the first touch-control driving electrode 21 and the second touch-control driving electrode 32 may be scanned simultaneously. That is, the touch-control driving signals may be outputted to the first touch-control driving electrode 21 and the second touch-control driving electrode 32 simultaneously. Accordingly, the disclosed touch-control display panel may effectively increase a scanning rate, and reduce scanning time.

Further, the distance between adjacent first touch-control driving electrodes in the first touch-control display region A1 may be equal to the distance between adjacent second touch-control driving electrodes in the second touch-control display region A2. As shown in FIG. 2, the distance between the first touch-control driving electrode 21 and the first touch-control driving electrode 22 in the first touch-control display region A1 may be equal to the distance between the second touch-control driving electrode 31 and the second touch-control driving electrode 32 in the second touch-control display region A2.

Further, referring to FIG. 3~FIG. 6, the touch-control display panel may also include a second substrate 4 and a plurality of touch-control detecting electrodes disposed on the second substrate 4. Specifically, the second substrate 4 may be arranged opposite to the first substrate 1. The touch-control driving electrodes may be disposed on one side of the first substrate 1 close to the second substrate 4. In one embodiment illustrated in FIG. 5, the second substrate 4 may be disposed above the first substrate 1, and the touch-control driving electrodes (i.e., the first touch-control driving electrodes and the second touch-control driving electrodes) may be disposed on the first substrate 1 and located between the first substrate 1 and the second substrate 4.

Figure 3:
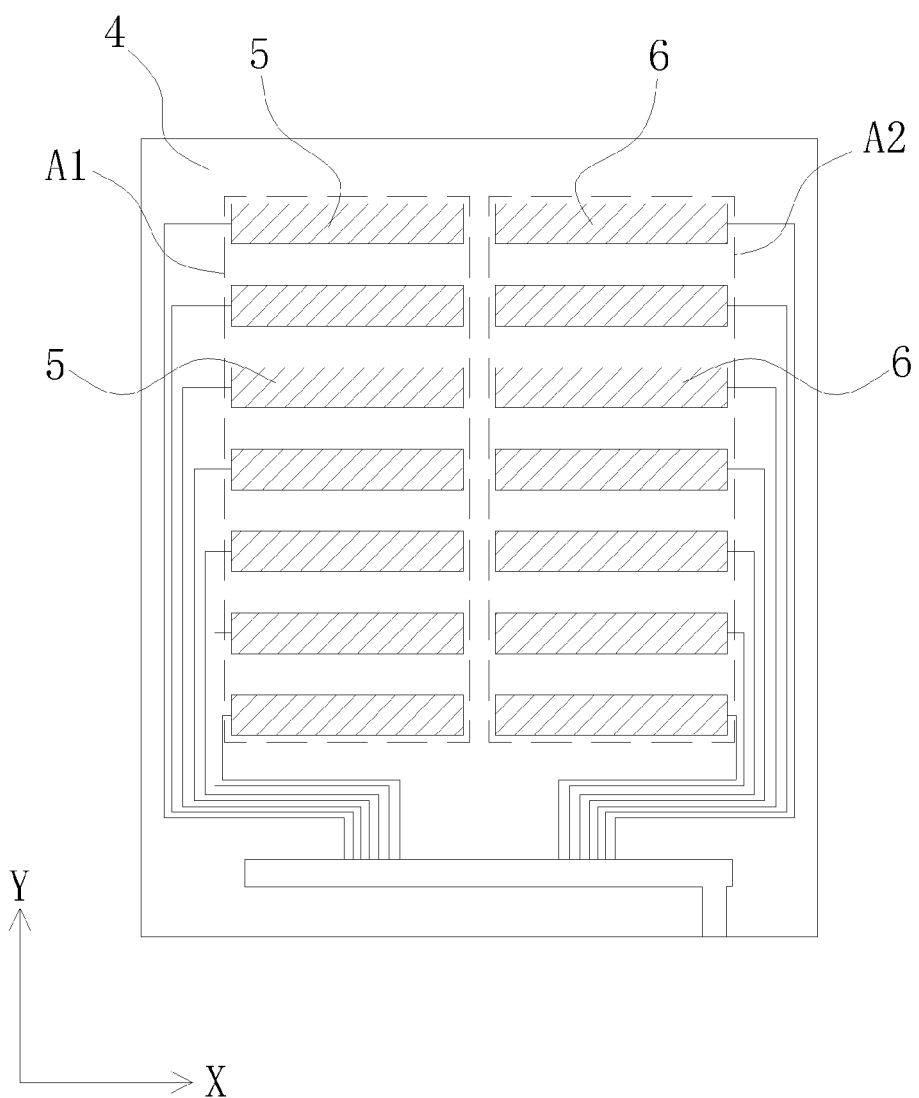
FIG. 3 illustrates a top view of an exemplary second substrate consistent with disclosed embodiments.
Figure 4:
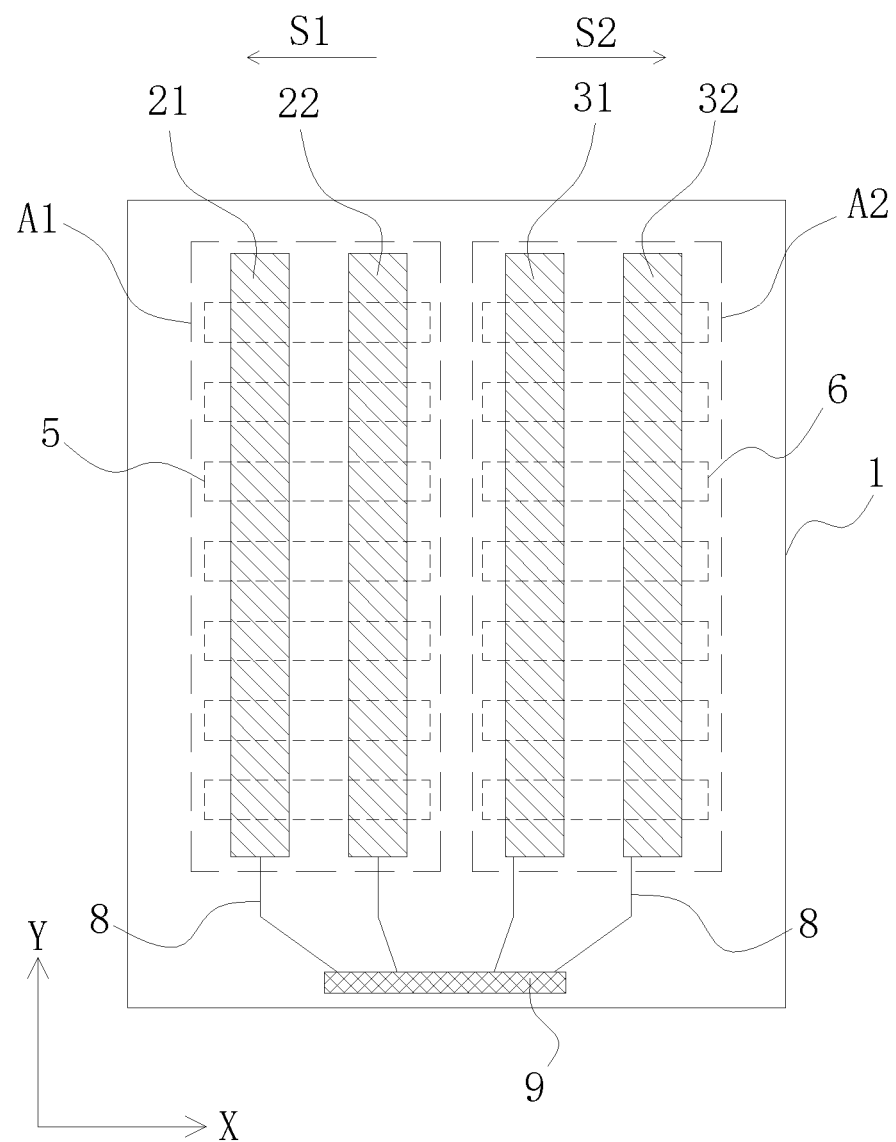
FIG. 4 illustrates projections of touch-control detecting electrodes in an exemplary touch-control display panel onto a first substrate consistent with disclosed embodiments.
Figure 5:
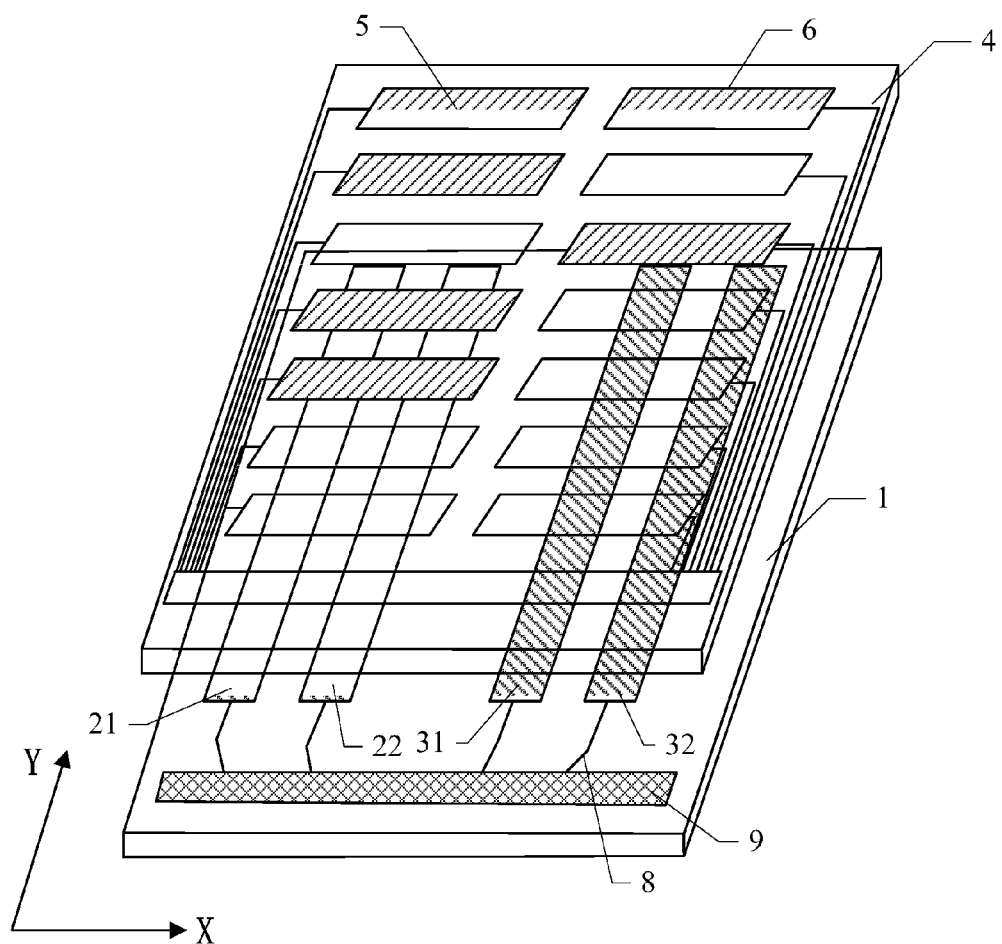
FIG. 5 illustrates a perspective view of an exemplary touch-control display panel consistent with disclosed embodiments.
Figure 6:
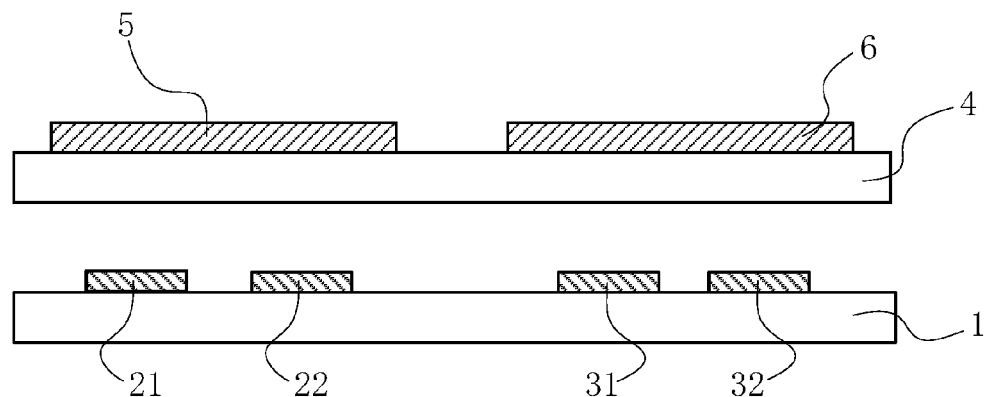
FIG. 6 illustrates a cross-sectional view of an exemplary touch-control display panel consistent with disclosed embodiments.

Each touch-control detecting electrode may extend along the first direction (i.e., the X direction). The touch-control detecting electrodes may be disposed on one side of the second substrate 4 facing away the first substrate 1, and may overlap a plurality of touch-control driving electrodes. As shown in FIG. 3 and FIG. 4, the touch-control detecting electrodes may be disposed on the second substrate 4.

Specifically, a plurality of touch-control detecting electrodes may be divided into a plurality of rows (e.g., seven rows in FIG. 3) along the second direction (e.g., the Y direction), and may be divided into two columns along the first direction (e.g., the X direction). Projections of the two columns of touch-control detecting electrodes may be located within the first touch-control display region A1 and the second touch-control display region A2, respectively. In one embodiment shown in FIG. 4, the touch-control detecting electrodes with projections located within the first touch-control display region A1 may be first touch-control detecting electrodes 5, and the touch-control detecting electrodes with projections located within the second touch-control display region A2 may be second touch-control detecting electrodes 6.

Projections of a plurality of first touch-control detecting electrodes 5 onto the first substrate 1 may overlap a plurality of first touch-control driving electrodes (i.e., the first touch-control driving electrode 21 and the first touch-control driving electrode 22) located within the first touch-control display region A1. Correspondingly, projections of a plurality of second touch-control detecting electrodes 6 on the first substrate 1 may overlap a plurality of second touch-control driving electrodes (i.e., the second touch-control driving electrode 31 and the second touch-control driving electrode 32) located within the second touch-control display region A2.

Further, when the disclosed touch-control display panel is scanned, coupling between one first touch-control driving electrode and a correspondingly overlapped touch-control detecting electrode in the first touch-control display region may be the same as coupling between one second touch-control driving electrode scanned simultaneously as the first touch-control driving electrode and a correspondingly overlapped touch-control detecting electrode in the second touch-control display region. An overlapping region in the first touch-control display region may correspond to an overlapping region in the second touch-control display region.

Thus, voltage fluctuation tendency of the first touch-control detecting electrode corresponding to the first touch-control display region may be consistent with voltage fluctuation tendency of the second touch-control detecting electrode corresponding to the second touch-control display region. Accordingly, mutual interference between the first touch-control detecting electrode and the second touch-control detecting electrode may be effectively reduced to avoid occurrence of abnormal detecting signals, thus touch-control detection may be carried out normally.

Further, as shown in FIG. 2, the touch-control display panel may also include a plurality of scanning lines 41 and a plurality of data lines 42. The scanning lines 41 may be disposed on the first substrate 1, and each scanning line 41 may extend along the first direction (the X direction). The data lines 42 may be exposed on the first substrate 1, and each data line 42 may extend along the second direction (the Y direction). The touch-control driving electrodes may be located above the data lines 42, and each touch-control driving electrode (i.e., the first touch-control driving electrodes and the second touch-control driving electrodes) may cover a plurality of data lines 42. For example, the touch-control driving electrodes may each cover two data lines 42.

Further, as shown in FIG. 2, the touch-control display panel may also include a plurality of touch-control lead wires 8. Each touch-control lead wire may be connected to one touch-control driving electrode (the first touch-control driving electrode or the second touch-control driving electrode), and all the touch-control lead wires 8 may be connected to a driving circuit 9.

Figure 7:
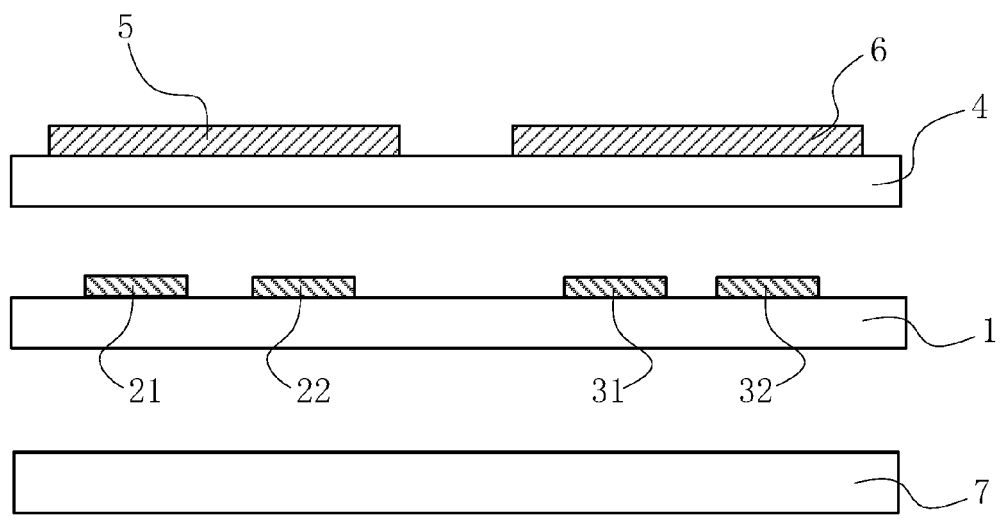
FIG. 7 illustrates a cross-sectional view of an exemplary touch-control display device consistent with disclosed embodiments.

Further, referring to FIG. 7, FIG. 7 illustrates a cross-sectional view of an exemplary touch-control display device consistent with the disclosed embodiments. The touch-control display device may include a touch-control display panel shown in FIG. 2~FIG. 6, and a backlight module group 7.

The backlight module group 7 may be disposed on one side of the first substrate 1 facing away the second substrate 4. In one embodiment shown in FIG. 7, the backlight module group 7 may be located below the first substrate 1. Because the touch-control display device adopts the above-described touch-control display panel, the voltage fluctuation tendency of the first touch-control detecting electrode corresponding to the first touch-control display region may be consistent with the voltage fluctuation tendency of the second touch-control detecting electrode corresponding to the second touch-control display region. Accordingly, mutual interference between the first touch-control detecting electrode and the second touch-control detecting electrode may be effectively reduced to avoid the detecting signals being abnormal, thus the touch-control detection may be carried out normally.

Figure 8:
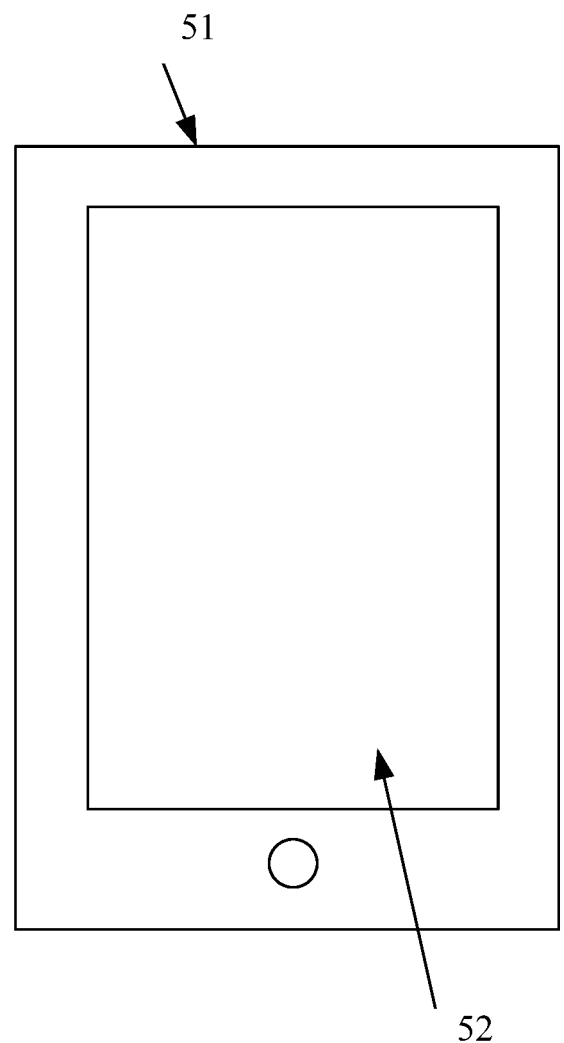
FIG. 8 illustrates a top view of an exemplary touch-control display device consistent with the disclosed embodiments.
Figure 9:
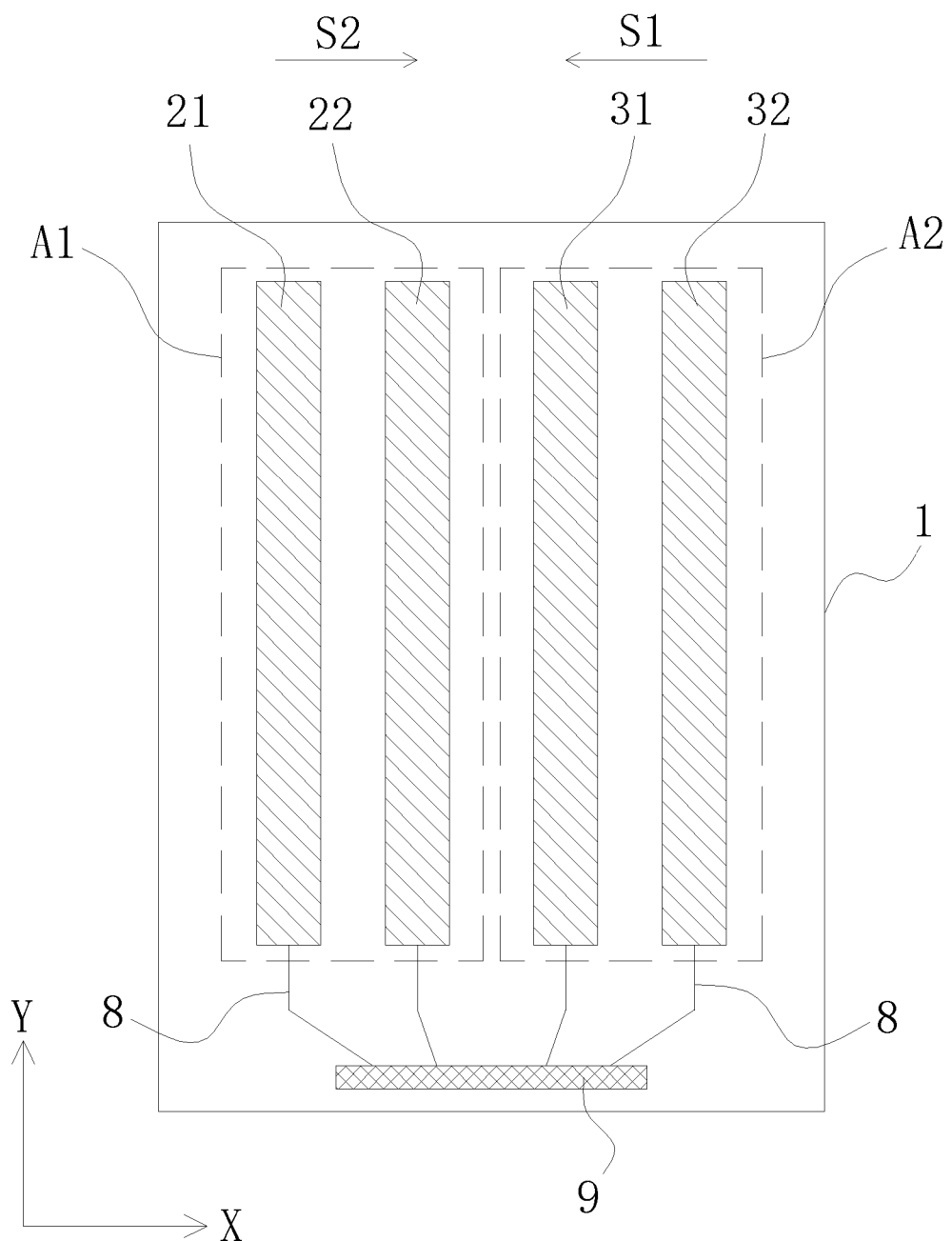
FIG. 9 illustrates a first substrate in another exemplary touch-control display panel consistent with disclosed embodiments.

FIG. 8 illustrates a top view of an exemplary display device consistent with the disclosed embodiments. As shown in FIG. 8, the touch-control display device 51 including any of the disclosed display panel 52 may be a tablet, a TV, a smartphone, a notebook, or a smart watch, etc. The disclosed touch-control display device may be a liquid crystal touch-control display device, or may be an organic light-emitting touch-control display device. However, the present disclosure is not intended to limit the specific type of the control-control display device.

Further, the present disclosure provides a driving method of the touch-control display panel illustrated in FIG. 2~FIG. 6. Specifically, each display period of the touch-control display panel may include at least one touch-control sensing period. The driving method may include in the touch-control sensing period, one first touch-control driving electrode and one second touch-control driving electrode may be scanned simultaneously. The distance from the first touch-control driving electrode to the second touch-control display region may be equal to the distance from the second touch-control driving electrode to the first touch-control display region. Further, the scanning direction of the first touch-control driving electrodes in the first touch-control display region may be opposite to the scanning direction of the second touch-control driving electrodes in the second touch-control display region.

Specifically, referring to FIG. 2~FIG. 6, during the touch-control sensing period, in the first touch-control display region A1, scanning may be carried out from the first touch-control driving electrode 22 nearest to the second touch-control display region A2 towards the first touch-control driving electrode 21. That is, the scanning may be carried out in a scanning direction S1 in FIG. 2 that is opposite to the X direction. In the second touch-control display region A2, scanning may be carried out from the second touch-control driving electrode 31 nearest to the first touch-control display region A1 towards the second touch-control driving electrode 32. That is, the scanning may be carried out in a scanning direction S2 in FIG. 2 that is consistent with the X direction.

In the present disclosure, signal amount received by each touch-control driving electrode may be the same. Thus, the coupling between one first touch-control driving electrode and a correspondingly overlapped touch-control detecting electrode in the first touch-control display region may be the same as the coupling between one second touch-control driving electrode scanned simultaneously as the first touch-control driving electrode and a correspondingly overlapped touch-control detecting electrode in the second touch-control display region.

The overlapping region in the first touch-control display region may correspond to the overlapping region in the second touch-control display region. Thus, the voltage fluctuation tendency of the first touch-control detecting electrodes corresponding to the first touch-control display region may be consistent with the voltage fluctuation tendency of the second touch-control detecting electrodes corresponding to the second touch-control display region. Accordingly, mutual interference between the first touch-control detecting electrodes and the second touch-control detecting electrodes may be effectively reduced to avoid the detecting signals being abnormal, thus the touch-control detection may be carried out normally.

Further, during the touch-control sensing period, touch-control driving electrodes not scanned may be connected to ground or may output display signals. As shown in FIG. 2, when the first touch-control driving electrode 22 and the second touch-control driving electrode 31 are scanned, the first touch-control driving electrode 21 and the second touch-control driving electrode may be connected to ground or may output display signals, which is not illustrated in detail.

As described above, the disclosed touch-control display panel may increase the scanning rate of the touch-control display panel by simultaneously scanning one first touch-control driving electrode in the first touch-control display region and one second touch-control driving electrode in the second touch-control display region. Specifically, the distance between the first touch-control driving electrode and the second touch-control display region may be the same as the distance between the second touch-control driving electrode and the first touch-control display region.

Further, the coupling between one first touch-control driving electrode and a correspondingly overlapped touch-control detecting electrode in the first touch-control display region may be the same as the coupling between one second touch-control driving electrode scanned simultaneously as the first touch-control driving electrode and a correspondingly overlapped touch-control detecting electrode in the second touch-control display region. The overlapping region in the first touch-control display region may correspond to the overlapping region in the second touch-control display region.

Thus, the voltage fluctuation tendency of the first touch-control detecting electrodes corresponding to the first touch-control display region may be consistent with the voltage fluctuation tendency of the second touch-control detecting electrodes corresponding to the second touch-control display region. Accordingly, mutual interference between the first touch-control detecting electrodes and the second touch-control detecting electrodes may be effectively reduced to avoid the detecting signals being abnormal, thus the touch-control detection may be carried out normally.

The present disclosure provides another exemplary display panel. Referring to FIG. 8, FIG. 8 illustrates a top view of a first substrate in the disclosed touch-control display panel. Different from the embodiment illustrated in FIG. 2, in one embodiment shown in FIG. 8, during the touch-control sensing period, in the first touch-control display region, scanning may be carried out from one first touch-control driving electrode farthest from the second touch-control display region. In the second touch-control display region, scanning may be carried out from one second touch-control driving electrode farthest from the first touch-control display region.

Specifically, as shown in FIG. 8, during the touch-control sensing period, in the first touch-control display region A1, scanning may be carried out in a direction from the first touch-control driving electrode 21 farthest to the second touch-control display region A2 to the first touch control driving electrode 22. That is, the scanning process may be carried out in the scanning direction S2 in FIG. 2 that is consistent with the X direction.

In the second touch-control display region A2, scanning may be carried out in a direction from the second touch-control driving electrode 32 farthest to the first touch-control display region A1 to the second touch control driving electrode 31. That is, the scanning process may be carried out in the scanning direction S1 in FIG. 2 that is opposite to the X direction. In the present disclosure, the signal amount received by each touch-control driving electrode may be the same.

Thus, the coupling between one first touch-control driving electrode and a correspondingly overlapped touch-control detecting electrode in the first touch-control display region may be the same as the coupling between one second touch-control driving electrode scanned simultaneously as the first touch-control driving electrode and a correspondingly overlapped touch-control detecting electrode in the second touch-control display region.

Further, the voltage fluctuation tendency of the first touch-control detecting electrodes corresponding to the first touch-control display region may be consistent with the voltage fluctuation tendency of the second touch-control detecting electrodes corresponding to the second touch-control display region. Accordingly, mutual interference between the first touch-control detecting electrodes and the second touch-control detecting electrodes may be effectively reduced to avoid the detecting signals being abnormal, thus the touch-control detection may be carried out normally.

Thus, the disclosed touch-control display panel may increase the scanning rate of the touch-control display panel by simultaneously scanning one first touch-control driving electrode in the first touch-control display region and one second touch-control driving electrode in the second touch-control display region. Specifically, the distance between the first touch-control driving electrode and the second touch-control display region may be the same as the distance between the second touch-control driving electrode and the first touch-control display region.

Further, the coupling between one first touch-control driving electrode and a correspondingly overlapped touch-control detecting electrode in the first touch-control display region may be the same as the coupling between one second touch-control driving electrode scanned simultaneously as the first touch-control driving electrode and a correspondingly overlapped touch-control detecting electrode in the second touch-control display region. The overlapping region in the first touch-control display region may correspond to the overlapping region in the second touch-control display region.

Thus, the voltage fluctuation tendency of the first touch-control detecting electrodes corresponding to the first touch-control display region may be consistent with the voltage fluctuation tendency of the second touch-control detecting electrodes corresponding to the second touch-control display region. Accordingly, mutual interference between the first touch-control detecting electrodes and the second touch-control detecting electrodes may be effectively reduced to avoid the detecting signals being abnormal, thus the touch-control detection may be carried out normally.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A driving method of a touch-control display panel including a first substrate including a first touch-control display region and a second touch-control display region arranged along a first direction, wherein the first touch-control display region and the second touch-control display region are arranged adjacent to each other; a plurality of touch-control driving electrodes disposed on the first substrate and extending along a second direction; a second substrate arranged opposite to the first substrate; and a plurality of touch-control detecting electrodes disposed on the second substrate, extending along the first direction, and overlapped with the plurality of touch-control driving electrodes, wherein the plurality of touch-control driving electrodes include a plurality of first touch-control driving electrodes distributed in the first touch-control display region and a plurality of second touch-control driving electrodes distributed in the second touch-control display region, a number of the first touch-control driving electrodes distributed in the first touch-control display region is equal to a number of the second touch-control driving electrodes distributed in the second touch-control display region, the plurality of first touch-control driving electrodes and the plurality of second touch-control driving electrodes include all the touch-control driving electrodes overlapped with the plurality of touch-control detecting electrodes, each first touch-control driving electrode of the plurality of first touch-control driving electrodes distributed in the first touch-control display region has a corresponding second touch-control driving electrode of the plurality of second touch-control driving electrodes distributed in the second touch-control display region, a distance from the each first touch-control driving electrode to the second touch-control display region is equal to a distance from the corresponding second touch-control driving electrode to the first touch-control display region, the each first touch-control driving electrode and the corresponding second touch-control driving electrode are scanned simultaneously, the driving method comprising:

in a touch-control sensing period, scanning the each first touch-control driving electrode and the corresponding second touch-control driving electrode simultaneously, wherein each display period of the touch-control display panel includes at least one touch-control sensing period, and a scanning direction of the first touch-control driving electrodes in the first touch-control display region is opposite to a scanning direction of the second touch-control driving electrodes in the second touch-control display region.

2. The driving method according to claim 1, wherein:
during the touch-control sensing period, in the first touch-control display region, scanning starts from the first touch-control driving electrode that is nearest to the second touch-control display region; and
in the second touch-control display region, scanning starts from the second touch-control driving electrode that is nearest to the first touch-control display region.

3. The driving method according to claim 1, wherein:
during the touch-control sensing period, in the first touch-control display region, scanning starts from the first touch-control driving electrode that is farthest to the second touch-control display region; and
in the second touch-control display region, scanning starts from the second touch-control driving electrode that is farthest to the first touch-control display region.

4. The driving method according to claim 1, wherein:
signal amounts received by each touch-control driving electrode are the same.

5. The driving method according to claim 1, wherein:
during the touch-control sensing period, the touch-control driving electrodes that are not scanned are connected to ground or output display signals.

6. The driving method according to claim 1, wherein:
a distance between adjacent first touch-control driving electrodes in the first touch-control display region is equal to a distance between adjacent second touch-control driving electrodes in the second touch-control display region.

7. The driving method according to claim 1, wherein:
the touch-control driving electrodes are disposed on one side of the first substrate facing towards the second substrate; and
the touch-control detecting electrodes are disposed on one side of the second substrate facing away the first substrate.

8. The driving method according to claim 7, wherein:
the plurality of touch-control detecting electrodes are divided into a plurality of rows along the second direction and are divided into two columns along the first direction,
wherein projections of one column of the touch-control detecting electrodes are disposed in the first touch-control display region, and projections of the other column of the touch-control detecting electrodes are disposed in the second touch-control display region.

9. The driving method according to claim 7, wherein:
the first direction is perpendicular to the second direction.

10. The driving method according to claim 1, wherein:
a plurality of scanning lines are disposed on the first substrate, and each scanning line extends along the first direction.

11. The driving method according to claim 1, wherein:
a plurality of data lines are disposed on the first substrate, and each data line extends along the second direction.

12. The driving method according to claim 11, wherein:
the touch-control driving electrodes are located above the data lines, and each touch-control driving electrode covers a plurality of data lines.

13. The driving method according to claim 1, wherein:
a plurality of touch-control lead wires is connected to the touch-control driving electrodes.

* * * * *